May 3, 1960
H. P. SMITH
2,935,364
BALL JOINT BEARING THRUST ASSEMBLY FOR
ROTARY TOOL HOLDING DEVICE
Filed Sept. 16, 1955
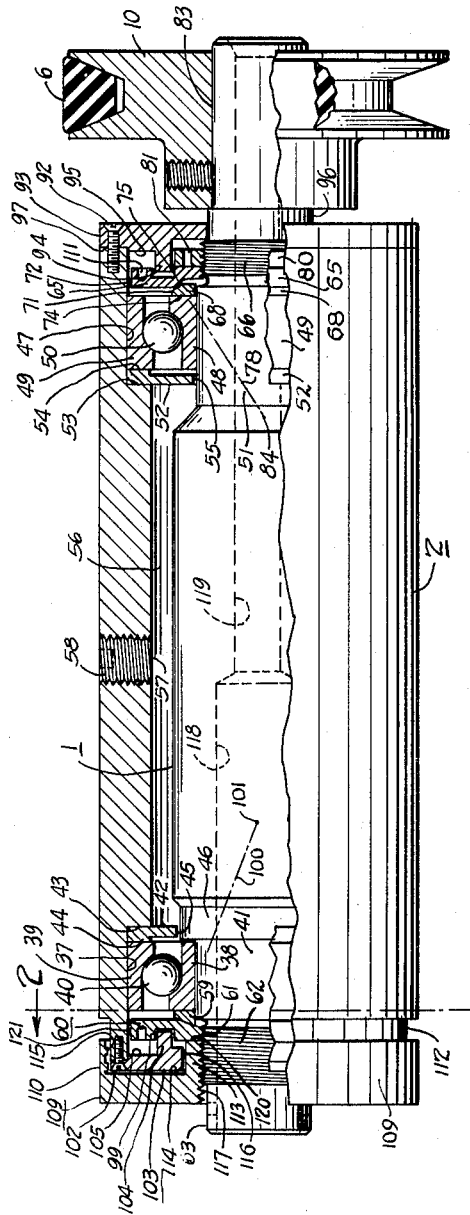
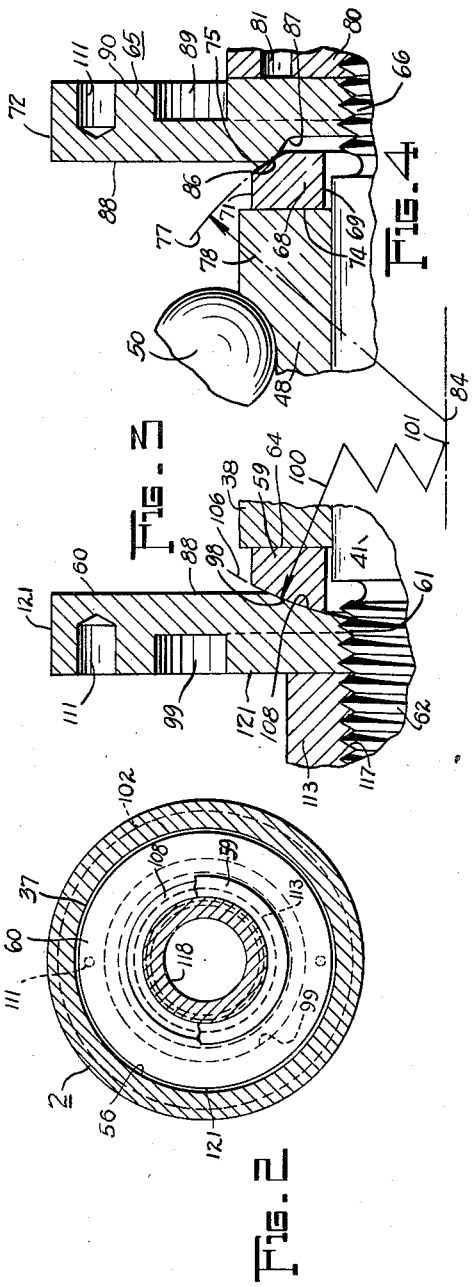
INVENTOR.
Horace P. Smith
BY
Schramm and Knowles
ATTORNEYS United States Patent Office 2,935,364
Patented May 3, 1960

2,935,364

BALL JOINT BEARING THRUST ASSEMBLY FOR ROTARY TOOL HOLDING DEVICE

Horace P. Smith, Cheshire, Conn.

Application September 16, 1955, Serial No. 534,827

16 Claims. (Cl. 308—189)

This invention relates to rotary tool holders, more particularly to a high speed spindle device for use as an attachment on a conventional machine such as a lathe or miller. The present spindle device or rotary tool holder can be fitted on a conventional lathe, miller or similar machine tool for the purpose of performing an operation such as grinding or burring. The range of machine operations that can be performed and the particular types of cuts that can be made are greatly increased by the present rotary tool holding device by reason of the high spindle speed that can be maintained without objectionable vibration. Reference is made to my co-pending application for patent on Rotary Tool Holding Device, Serial No. 418,497, filed March 25, 1954, now Patent 2,809,475, dated October 15, 1957, of which this is a continuation-in-part.

The principal object of the present invention is to provide a generally improved device of the character mentioned which is of such design that its versatility and adaptability to various grinding, cutting and polishing operations is greatly enhanced. A more particular objective is to provide such a device having an improved spindle arrangement which permits operation at extremely high speeds, especially with burrs and similar tools used internally of the work, without objectionable vibrating or chattering, to obtain true cutting and adherence to close tolerances.

In the device of the present invention the spindle is mounted within a housing as by roller bearing assemblies spaced axially along the length of the spindle, the bearings being loaded to eliminate objectionable end play of the spindle in operation. The loading of the bearings is effected as by securing either the inner or the outer races against axial shifting and applying opposed axial forces to the races not so held by a ball or spherical type joint. In the preferred arrangement, shown in the drawings and described in greater detail hereinafter, the outer races of the bearings are held in predetermined spaced relation as against internal shoulders in the housing, the inner races being relatively shiftable toward one another along the spindle over which they have a snug fit. Both of the inner races may be adjustable or shiftable axially on the spindle, or, in a more economical mode of practicing the invention, one of the inner races may be located against a radial shoulder on the spindle and the other of the inner bearing races shifted axially as by a nut screw-threaded onto the spindle. By simple reversal of parts, the inner races of the bearing assemblies may, of course, be located in fixed positions on the spindle, as by being abutted against radial shoulders, and the outer races, or one of them, may be shifted to apply equal and opposite axial loads to the bearings.

In applying an axial load to the bearing assemblies of a rotary tool holder of the high speed spindle type it is desirable to avoid any condition of unbalance and any condition of unequal loading of different roller elements, these being further objectives of the invention. By utilizing a circular disc shaped or washerlike nut to apply an axial load to the adjustable bearing race and by interposing a washer or circular thrust disc between such discnut and the race with ball joint or spherical contact between such discs, an improved loading effect is obtained with better balance and more uniform loads on the circumferentially spaced roller elements of the bearing assembly. As a refinement of this aspect of the invention the meeting faces of the nut-disc and the interposed thrust washer-disc are highly finished, these elements preferably being made of an alloy steel capable of taking a high polish.

To obtain the desired spherical ball joint arrangement the discs have complemental spherical surfaces or one of them has a spherical surface and the other a face adapted to make circular line contact with the spherical surface. The spherical surface or surfaces are generated by a radius (or radii) centered on the axis of the spindle to achieve a contact which is free to shift. This spherical contact arrangement permits the discs to shift relative to one another and assures uniform application of the axial load on the bearing about its entire circumference.

Other objects and advantages pertain to certain novel features of construction and combinations and arrangements of parts shown in the drawings, which constitute part of the specification, and are set forth in the following detailed descriptions of spindle devices which represent the preferred and best modes of practicing the invention.

In the drawings:

Fig. 1 is an elevational view, partially in section and with parts broken away and removed, of a rotary high speed tool holding device embodying the principles of the present invention;

Fig. 2 is a transverse sectional view taken substantially along line 2—2 of Fig. 1 showing details of the closure arrangement employed at one end of the housing;

Fig. 3 is an enlarged fragmentary sectional view taken radially through a pair of complemental thrust and nut discs of the type used for placing the bearings under axial load, these being the discs at the left end of Fig. 1; and Fig. 4 is a view in section similar to Fig. 2 showing the disc arrangement at the right end of Fig. 1 and representing another arrangement for obtaining the desired ball joint loading of the invention.

In the present device a steel spindle 1 is located within a tubular housing 2 and pulley 10 driven by V belt 6 is fast on one end of the spindle to transmit rotating forces to the spindle.

The spindle is supported by a pair of spaced thrust type ball bearing assemblies to rotate about an axis extending through the open ends of the cylindrical housing 2, the spindle being coaxial to the circular sectioned housing. One of the bearing assemblies is located in a counterbore 37 at the tool carrying end of the spindle and comprises inner and outer races 38 and 39, respectively, and a plurality of rolling elements or balls 40 between and spacing the races in the usual manner. The other or pulley end of the spindle is supported by a similar bearing assembly located in a counterbore 47 and comprising inner and outer races 48 and 49, respectively, a series of rotatable elements or balls 50 being interposed between the races. The contacting surfaces of the races and balls of the two bearing assemblies are hardened and polished in the usual manner customary with roller and ball bearings, it being satisfactory to employ standard bearing assemblies capable of resisting axial thrust. Spacers or retainers for engaging and locating the balls or rolling elements in circumferentially spaced relation about the bearings may be employed but are omitted from the drawings for clarity. The housing counterbores 37 and 47 into which the outer races of the bearing assemblies are closely fitted and pressed may be and are here shown to be of the same diameter, and spindle portions 41 and 51 onto which the inner races 38 and 48, respectively, are closely fitted and pressed are of the same diameter.

Intermediate the axially spaced bearing assemblies the interior of the housing 2 constitutes an annular lubricant chamber 56 which surrounds the spindle. Access to the lubricant chamber is through a central opening 57 in the wall of the housing 2, this hole normally being closed by a screw plug 58.

At its ends the lubricant chamber 56 is defined by suitable radially disposed partition means here shown in the form of circular washers 42 and 52. The outer peripheries of the partition washers are circumferentially embraced and held by the housing and their inner peripheries have close running fits with axially spaced cylindrical portions of the spindle. Circular opening 45 in the partition disc 42 receives an axially short intermediate diameter cylindrical portion 46 of the spindle which connects the large diameter central spindle portion to the race receiving reduced diameter portion 41. Circular opening 55 in the partition disc 52 receives the reduced diameter race receiving spindle portion 51. The running fit clearances between the spindle and the inner peripheries of the partition washers or discs will vary, depending upon the particular application of the device and the lubricant employed. Clearances of from about .0003" to about .02" have been found to be satisfactory, the usual clearance being from about .001" to about .01", preferably of the order of about .005", plus or minus .002". It is through these annular clearances between the inner peripheries of the partition washers 42 and 52 and the rotating surface of the spindle that lubricant migrates from the chamber 56 into those portions of the housing interior which contain the bearing assemblies.

To obtain optimum operating conditions at high speed of rotation the ball bearing assemblies are preferably lubricated by a very thin or light lubricant film such as results from atomizing or vaporizing of the lubricant. Such a result is obtained by packing the chamber 56 with a bleeding type grease, such as Texaco Regal Starfax No. 2. The liquid, released at a slow rate by such a solid lubricant, migrates axially along the spindle through the clearances provided between the spindle and the partitions or washer-discs 42 and 52 into the bearing assembly chambers. Rotation of the spindle, races and balls then effects distribution of the lubricant in the desired manner.

To secure the washer partitions 42 and 52 in the housing they are clamped between the outer races of the bearing assemblies and radial shoulders 43 and 53 at the ends of the housing counterbores 37 and 47, respectively. Light axial loading is applied to the inner races of the bearing assemblies which, transmitted through the balls or rolling elements 40 and 50, acts on the outer bearing races to hold the latter against circular raised lands having end faces 44 and 54 at the outer margins of the partition discs 42 and 52.

The bearing assemblies are loaded to take up end play by applying axial forces to the inner races 38 and 48. One of the inner races may be located and held in fixed predetermined position on the spindle as by direct engagement with a nut which holds the inner race against a radial locating shoulder, the inner race of the other bearing assembly being held by a suitable ball joint assembly constructed in accordance with the principles of the present invention, or preferably, and as shown, ball thrust joints are employed at both ends of the spindle.

At the left or tool holding end 63 of the spindle the inner race 38 is engaged by a ring 59 which has a sliding fit on the reduced diameter portion 41 of the spindle and in turn is engaged by a retaining ring 60 formed with internal threads 61 that engage the spindle threads 62. In this connection it is to be observed that the greatest or crest diameter of the threads 62 is less than the diameter of the spindle portion 41 which receives the inner bearing race 38 so that the race can be readily moved over the threaded portion of the spindle onto the cylindrical portion 41 in assembly. Like the inner race 38, the thrust ring 59 has a cylindrical inside surface of larger diameter than the crest diameter of the threads so that the ring is readily assembled over the threaded portion of the spindle and is received locatingly on the cylindrical spindle portion 41 outwardly of the inner race 38. The geometry of the parts is such that the ring 59 projects axially from the cylindrical spindle portion 41 onto the threaded spindle portion 62 for direct engagement by the internally threaded retaining ring 60, which, by reason of its threaded engagement with the spindle, holds the thrust ring 59 firmly against the inner race 38.

Axial force is applied to the inner bearing race 48 at the right or pulley end 83 of the spindle to move it to the left, relative to the spindle, as viewed in Fig. 1, by a nut-washer or disc 65 which is screwed onto a threaded portion 66 of the spindle adjacent to and of less diameter than the cylindrical spindle portion 51 on which is carried the inner bearing race 48. Interposed between the nut or loading disc 65 and the inner race is a centering washer or thrust disc 68 which bears axially against one radial end face of the bearing race over a circular contact area which surrounds the spindle. The centering washer 68 is formed with an internal cylindrical surface 69 that has a free fit over the end of the cylindrical spindle portion 51 with clearance, as shown. The disc 68 has an outer peripheral surface 71 which has a diameter substantially equal to the diameter of the outer peripheral surface of the inner race 48 to permit lubricant supplied to the roller elements 50 of the bearing to be transmitted to the disc 68.

The washer-disc 65 has an outer periphery 72 which is circular, being concentric to the rotational axis of the spindle and of such diameter that the disc periphery is located radially beyond the roller elements or balls 50 of the adjacent bearing assembly. The circular periphery 72 has a sufficiently large diameter to cause it to be in relatively close association with the inner surface of the housing counter-bore 47 to create a bar to passage of dust, grit and dirt.

To obtain appropriate, consistent, and proper alignment of the loading washer-nut 65 and the centering disc 68, contacting engaging surfaces 75 and 86 are appropriately machined to provide a circular line contact or abutment which generates a spherical surface when the disc and the load nut are relatively moved. The intersection of such spherical surface with the plane of the drawing is indicated at 77, Fig. 4 and has a radius of curvature 78 centered at 84 on the axis of the spindle. By providing relatively movable thrust elements having complementary surfaces which generate a sphere centered on the spindle axis, axial loading of the bearing is applied in a circumferentially uniform manner.

Referring to Fig. 4, the centering disc 68 has a contacting spherically curved surface 75 which is defined in cross section by a segment of a circle of the radius 78. A circular ridge 86 provided on the washer-nut 65 by the intersection of radial face 88 and central circular dished surface 87 of such washer makes circular line contact with the spherically curved surface 75 of the centering disc 68, all the axial thrust forces acting between the disc and washer being transmitted at this circular contact line.

A lock nut 80 is received on the threaded spindle portion 66 outside the nut disc 65 and when drawn up against the latter secures it against unscrewing. The lock nut 80 may have a cylindrical periphery, turning being effected by a spanner wrench (not shown) the lugs of which are received in a number of axial sockets 81 spaced circumferentially about the nut.

To insure application of the axial loading to the bearing races in a uniform manner, side faces 44 and 54 of the partitions and side faces 64 and 74 of the bearing retainer disc and centering disc respectively are ground and polished, such polished surfaces of the partition washers 42 and 52 preferably being formed on the radial end faces of the axially directed shallow flange portions of these components which constitute the lands peviously mentioned. By thus forming the race contacting surface on the end of an integral flange portion which projects axially beyond the main body of the particular component, the grinding and polishing of such end surface is facilitated and proper contact between the finished surface and the appropriate bearing race is assured.

The end openings of the housing through which are projected the tool end 63 and the oppositely directed pulley receiving end 83 of the spindle are closed by suitable dust seal assemblies.

Surface 90 of the nut-washer or disc 65 is formed with an annular relief or channel groove 89 which is substantially rectangular in section and concentric to the rotational axis of the spindle. An end plate 93 is affixed over the open end of the housing as by counter-sunk screws 92 to form a closure or end cover. An axially directed annular flange 94 is provided on inner surface 95 of the end plate 93, which flange is disposed about the lock nut 80 in surrounding relation and extends into and cooperates with the walls of the annular relief 89 to form a dust seal, the flange having a running fit in the annular groove. The end cover plate 93 is centrally apertured to receive the spindle, its inner periphery being disposed about and in relatively close association with reduced diameter spindle portion 96 to effect a dust seal. The end cover plate is preferably inset slightly into the housing as through provision of annular peripheral rabbet 97.

The complemental rings 59 and 60 constitute a ball joint thrust assembly which, although of different construction than that shown in Fig. 4, obtains the desired universal tilting action of one member on the other so as to equalize the axial thrust about the entire circumferential extent of the inner race of the ball bearing assembly with which the thrust joint is associated. In the arrangement of Fig. 3, one of the mating rings, here the thrust ring 59, is formed with a spherically curved surface 98 which is generated by a radius 100 centered at 101 on the rotational axis of the device. The intersection of the spherical surface, of which the surface 98 is a segment or part, with the plane of the drawing as indicated at 106, Fig. 3.

The retaining ring 60 is formed with a central recess having a spherically curved surface 108 that matches the spherical curvature of the surface 98 of the thrust ring 59. Thus in the arrangement of Fig. 3 the thrust between the pressure discs of the ball joint assembly is transmitted over annular complemental spherically curved surfaces where the discs or washers come together as distinguished from the line contact arrangement shown in Fig. 4. It is intended, of course, that either the arrangement of the spherically curved contacting surface of Fig. 3 may be used at both ends of the spindle or the line contact arrangement of Fig. 4 may be used at both ends of the spindle. It is also feasible, of course, to use the line contact arrangement of Fig. 4 at the left or tool end of the device as viewed in Fig. 1 and to use the spherically curved surface contact arrangement of Fig. 3 at the right or pulley end of the device.

At the tool end 63 of the spindle, retaining nut ring 60 has annular relief 99, comparable in shape and function to the relief 89 in the nut disc 65. An end cover plate 103, resembling the end plate 93 is affixed over the tool end of the housing by countersunk screws 102. Annular flange 104 is provided on inside surface 105 of the end cover 103 to cooperate with the walls of the relief or channel 99 within which it is received in a running fit in effecting a substantially dust proof seal. An annular rabbet at the periphery of the surface 105 permits end cover 103 to be locatingly inset in the housing opening in a manner similar to the end cover 93.

An outside cap or cover 109 is provided to further seal the tool end of the housing 2. The outer cover 109 has an annular rim flange 110 which surrounds and co-operates with a reduced diameter portion 112 at the end of the housing.

On the inside surface of the circular rim flange 110 is formed spiral ridge or thread 115 which may be of rectangular section as shown and the crest of which has a close running fit with the outwardly directed cylindrical surface of the reduced diameter end 112 of the housing. The direction of the spiral ridge or thread 115 is such as to tend to unscrew the cap 109 from off the end of the housing when the spindle is rotated in use. The end cap 109 has integral axially extending hub 113 which may be in the form of an annular flange that projects through a circular opening 116 in the center of the cover plate 103, the inner peripheral surface 116 of the cover plate 103 having a running fit with the outside cylindrical surface of the hub flange 113. By this arrangement of parts the closure cap 109 constitutes a lock nut, radial end face 120 of the hub flange 113 engaging directly outer radial face 121 of the retaining ring 60 to hold the latter in fixed position on the spindle. Thus, in effect, the closure cap 109 is formed on one side with an annular channel 114 which is concentric to the rotational axis of the device and which receives the end cover plate 103.

During operation of the spindle the rotary movement of the spiral ridge 115 relative to the external cylindrical surface 112 resists the migration of cutting or grinding coolants and other liquid into the space between the cover plate 103 and the end cap 109 and, in effect, provides a pumping action which keeps the internal spaces and chambers clear of liquids. The running fits of the annular flanges 94 and 104 in the end cover plate grooves 89, 99 provide mazes which further protect the inner bearing assembly chambers of the device from the entrance of dirt and grit.

To turn the end closure plates 60 and 65 onto or off of the threaded portions of the spindle, such plates are formed with axial recesses or sockets 111 adjacent their outer peripheries to receive the lugs of a suitable spanner wrench. The spindle 1 may be formed with an axial bore to receive various types of burs, grinders, and other cutting tools, such internal bore being formed, if desired, with coaxial portions of different diameters such as indicated at 118 and 119.

The high speed spindle device of the present invention can be initially assembled with solid lubricant of the bleeding type in the chamber 56 sufficient to last for its normal life or use period. The axial load or slack take up applied to the bearing assemblies by the bearing adjustment discs or loading nuts 60, 65 effectively prevents objectionable end play and permits high speed operation without vibration or chatter. Spindle devices of this type are customarily operated at speeds above 10,000 revolutions per minute. They are frequently used at speeds of from 25,000 to 50,000 r.p.m. and in test conditions have been turned at speeds over 80,000 r.p.m. An apparatus has thus been described and illustrated in which axial load is applied in a uniform manner about the entire circumference of the bearing race through the use of discs having complemental surfaces at least one of which constitutes a segment of a sphere having a radius of curvature centered on the axis of the spindle.

The spherical surfaces of contact between the thrust elements of the ball joint assemblies, such spherical surfaces being represented at 106 and 77 of Figs. 3 and 4 respectively, are preferably of relatively short radius so that radial shifting of the thrust rings 59 and 68 is minimized. For example, the spherical radius 78 is preferably about equivalent in length to the diameter of the circular ridge 86 on the nut-washer 65 which makes line contact with the spherically curved surface 75 of the centering ring 68. Similarly, the radius 100 is preferably about equivalent to the maximum diameter of the centering ring 59, although, of course, spherical contact surfaces of larger radius can be employed with less advantage, but in all cases should be less than the axial spacing of the rollers or balls 40 and 50 of the bearing assemblies.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In combination in a high speed rotary spindle construction, a bearing assembly having inner and outer race members and a plurality of rolling elements disposed between the race members, a spindle received through the inner race member, a mounting member embracing the outer race member, said bearing assembly supporting the spindle for rotation about a fixed axis in and relative to the mounting member and constraining the spindle against lateral shifting relative to the mounting member, and a pair of annular elements disposed about the spindle for applying an axial load to one of the race members of the bearing assembly, said pair of elements being formed complementally for universal tilting movement relative to one another about a point on the spindle axis, one of said pair of elements and the one bearing race being constrained by the spindle to maintain coaxial relation, and the other of said pair of elements being mounted for slight radial shifting incidental to such tilting relative to such constrained element and to the one race member and the spindle.

2. In combination in a high speed rotary spindle construction, a bearing assembly having inner and outer race members and a plurality of rolling elements disposed between the race members, a spindle, a mounting member of circular section embracing the outer race member, the inner base member being received about the spindle in embracing relation with the spindle supported thereby in coaxial relation to the mounting member, said bearing assembly constraining the spindle against lateral shifting relative to the mounting member, a pair of elements for applying an axial load to one of the race members of the bearing assembly, one of said pair of elements being formed with a spherically curved bearing surface, and the other of said pair of elements being formed with a circular ridge engageable with said bearing surface, for universal tilting movement, one of said pair of elements and the one bearing race being constrained by the spindle to maintain coaxial relation, and the other of said pair of elements being mounted for slight radial shifting incidental to such tiltiting relative to such constrained element and to the one race member and the spindle.

3. In combination in a high speed rotary spindle construction, a bearing assembly having inner and outer race members and a plurality of rolling elements disposed between the race members, an elongated spindle, a mounting member embracing the outer race member, the inner race member being received about the spindle in embracing relation, said bearing assembly supporting the spindle for rotation about a fixed axis in and relative to the mounting member and constraining the spindle against lateral shifting relative to the mounting member, a pair of annular elements for applying an axial load to one of the race members of the bearing assembly, and said pair of elements being formed with complemental spherically curved bearing surfaces for universal tilting movement relative to one another about a point on the spindle axis, one of said pair of elements and the one bearing race being constrained by the spindle to maintain coaxial relation, and the other of said pair of elements being mounted for slight radial shifting incidental to such tilting relative to such constrained element and to the one race member and the spindle.

4. In combination in a high speed rotary spindle construction, a bearing assembly having inner and outer race members and a plurality of rolling elements disposed between the race members, a spindle, a mounting member of circular section embracing the outer race member, the inner race member being received about the spindle in embracing relation to support the latter coaxially in the mounting member, said bearing assembly constraining the spindle against lateral shifting relative to the mounting member, a pair of elements for applying an axial load to the inner race member of the bearing assembly, said pair of elements including a relatively small diameter disc engaging such inner race member and a relatively large diameter disc threaded on the spindle, said discs being formed complementally for universal tilting movement relative to one another about a point on the spindle axis, one of said pair of elements and the one bearing race being constrained by the spindle to maintain coaxial relation, and the other of said pair of elements being mounted for slight radial shifting incidental to such tilting relative to such constrained element and to the one race member and the spindle.

5. In combination in a high speed rotary spindle construction, a bearing assembly having inner and outer race members and a plurality of rolling elements disposed between the race members, a spindle, a mounting member formed with a circular opening and embracing the outer race member, the inner race member being received about the spindle in embracing relation to support the latter coaxially in the mounting member, said bearing assembly constraining the spindle against lateral shifting relative to the mounting member, a pair of annular elements for applying an axial load to one of the race members of the bearing assembly, one of said pair of elements being of relatively small radial extent and engaged against said one race, the other of said pair of elements being of relatively large radial extent, means for applying an axial load to said other element, and said elements being engaged directly against one another and formed complementally for universal tilting movement relative to one another about a point on the spindle axis, one of said pair of elements and the one bearing race being constrained by the spindle to maintain coaxial relation, and the other of said pair of elements being mounted for slight radial shifting incidental to such tilting relative to such constrained element and to the one race member and the spindle.

6. In combination in a rotary tool holding device, said device comprising a hollow housing having an open cylindrically curved end, a spindle in the housing and projecting axially through said open end, bearings supporting the spindle in the housing, said spindle having a threaded portion on said one end, a circular washer plate threaded on the spindle and projecting radially therefrom, said washer plate being located wholly within the housing, a closure plate carried by the housing and disposed across the opening on the outside of the washer plate, said closure plate having a central opening concentric to the spindle, one of said plates being formed with an annular groove concentric to the rotational axis of the spindle, the other of said plates being formed with an annular projecting rib extending into said groove and having a running fit therein, a dust cap secured on the threaded end of the spindle for rotation with the latter and located on the outside of the closure plate, and said cap being formed with an annular recess adapted to receive the closure plate and with a hub portion extending through the central opening of the closure plate and bearing axially against the washer plate.

7. In combination in a rotary tool holding device, said device comprising a hollow housing having an open cylindrically curved end, a spindle in the housing and projecting axially through said open end, bearings supporting the spindle in the housing, said spindle having a threaded portion on said one end, a circular washer plate threaded on the spindle and projecting radially therefrom, said washer plate being located wholly within the housing, a closure plate carried by the housing and disposed across the opening on the outside of the washer plate, said closure plate having a central opening concentric to the spindle, the inner periphery of the closure plate being spaced from the spindle by an annular clearance, one of said plates being formed with an annular groove concentric to the rotational axis of the spindle, the other of said plates being formed with an annular projecting rib extending into said groove and having a running fit therein, a dust cap secured on the threaded end of the spindle for rotation with the latter and located on the outside of the closure plate, said cap being formed with an annular recess adapted to receive the closure plate and with a hub portion extending through the central opening of the closure plate and bearing axially against the washer plate, said recess being defined in part by an outer wall disposed in overlying relation to and having a running fit with the outside of the housing.

8. In combination in a rotary tool holding device, said device comprising a hollow housing having an open cylindrically curved end, a spindle in the housing and projecting axially through said open end, bearings supporting the spindle in the housing, said spindle having a threaded portion on said one end, a circular washer plate threaded on the spindle and projecting radially therefrom, said washer plate being located wholly within the housing, said washer plate being arranged to bear axially against one of the bearings, a closure plate carried by the housing and disposed across the opening on the outside of the washer plate, said closure plate having a central opening concentric to the spindle, the inner periphery of the closure plate being spaced from the spindle by an annular clearance, a dust cap secured on the threaded end of the spindle for rotation with the latter and located on the outside of the closure plate, said cap being formed with an annular recess adapted to receive the closure plate and with a hub portion extending through the central opening of the closure plate and bearing axially against the washer plate, said recess being defined in part by an outer wall disposed in overlying relation to and having a running fit with the outside of the housing, said outer wall of the recess being formed with a helical ridge, and said dust cap having an inner hub portion extending through the annular clearance space between the spindle and the closure plate and being abutted against the washer plate to hold the latter in said axial bearing relation against said one of the bearings.

9. In combination in a rotary tool holding device, said device comprising a hollow housing having an open cylindrically curved end, a spindle in the housing and projecting axially through said open end, bearings supporting the spindle in the housing, said spindle having a threaded portion on said one end, a circular washer plate threaded on the spindle and projecting radially therefrom, said washer plate being located wholly within the housing, said washer plate being arranged to bear axially against one of the bearings, a closure plate carried by the housing and disposed across the opening on the outside of the washer plate, said closure plate having a central opening concentric to the spindle, the inner periphery of the closure plate being spaced from the spindle by an annular clearance, one of said plates being formed with an annular groove concentric to the rotational axis of the spindle, the other of said plates being formed with an annular projecting rib extending into said groove and having a running fit therein, a dust cap secured on the threaded end of the spindle for rotation with the latter and located on the outside of the closure plate, and said cap being formed with an annular recess adapted to receive the closure plate and with a hub portion extending through the central opening of the closure plate and bearing axially against the washer plate.

10. In combination in a rotary tool holding device, said device comprising a hollow housing having an open cylindrically curved end, a spindle in the housing and projecting axially through said open end, bearings supporting the spindle in the housing, said spindle having a threaded portion on said one end, a circular washer plate threaded on the spindle and projecting radially therefrom, said washer plate being located wholly within the housing, said washer plate being arranged to bear axially against one of the bearings, a closure plate carried by the housing and disposed across the opening on the outside of the washer plate, said closure plate having a central opening concentric to the spindle, the inner periphery of the closure plate being spaced from the spindle by an annular clearance, one of said plates being formed with an annular groove concentric to the rotational axis of the spindle, the other of said plates being formed with an annular projecting rib extending into said groove and having a running fit therein, a dust cap secured on the threaded end of the spindle for rotation with the latter and located on the outside of the closure plate, said cap being formed with an annular recess adapted to receive the closure plate and with a hub portion extending through the central opening of the closure plate and bearing axially against the washer plate, said recess being defined in part by an outer wall disposed in overlying relation to and having a running fit with the outside of the housing, and said outer wall of the recess being formed with a helical ridge.

11. In combination in a high speed rotary tool holding device of the type comprising an outer housing, a spindle in the housing and a pair of spindle supporting bearing assemblies spaced axially along the spindle, each bearing assembly having inner and outer race members, the inner race members engaging the spindle, the outer race members engaging the housing, said bearing assemblies supporting the spindle for rotation about a fixed axis in the housing and constraining the spindle against lateral shifting and tilting in the housing, a structure for loading the bearing assemblies axially, said loading structure comprising a disc element surrounding the spindle and abutting axially against one of the bearing members over a contact area which surrounds the spindle, a washer element surrounding the spindle and abutting the disc element in a circular line of engagement surrounding said spindle, one of the elements having a spherically curved abutment surface generated by a radius of curvature having a center on the axis of the spindle, means to exert an axial force on said washer element, such axial force being transmitted from said washer element through said disc element to said one bearing member, said disc element and said washer element being relatively movable one on another while said circular engagement line is maintained on the spherically curved surface, one of said elements and said one bearing member being constrained by the spindle to maintain coaxial relation, and the other of said elements being mounted for shifting movements, incidental to said tilting, relative to the constrained element, to the one bearing member and to the spindle, in a plane normal to the rotational axis of the spindle, and means preventing relative axial movement of other bearing members in the direction of such axial force whereby to place the bearing under axial load.

12. A high speed rotary tool holding device having a housing, a spindle disposed within the housing, and bearings disposed within the housing and about the spindle, one of the bearings having inner and outer races and roller elements therebetween, the outer race being in snug association with the housing, the inner race being in snug association with the spindle, the bearings serving to support said spindle in the housing for rotation about a fixed axis in the housing and constraining the spindle against lateral shifting and tilting in the housing, said device including means to place the roller elements under axial load, said loading means comprising a first disc surrounding the spindle and disposed in spindle surrounding contact with one of the races, a second disc also surrounding the spindle and disposed in mating engagement with the first disc over a circular spherically curved abutment locus generated by a radius centered on the axis of said spindle, at least one of said discs having a spherically curved surface disposed to contact the other disc in such circular engagement, said discs being relatively movable one against the other to provide uniform distribution of axial forces over such circular engagement, one of said discs and said one race being constrained by the spindle to maintain coaxial relation, and the other of said discs being mounted for shifting movements incidental to said tilting relative to the constrained disc to the one race and to the spindle in a plane normal to the rotational axis of the spindle, means exerting axial force against the second disc, said axial force being transmitted to said first disc through said circular engagement, said force being further transmitted from said first disc to said one race through said spindle surrounding contact therebetween, and means cooperating with the other race to prevent axial shifting of the other race in the direction of said axial force whereby to cause said axial force to move the one race axially relative to the other race and cause said roller elements to be placed under load.

13. A high speed rotary tool holding device having a housing, a spindle disposed within the housing, and bearings disposed within the housing and about the spindle, one of the bearings having inner and outer races and roller elements therebetween, the outer race being in snug association with the housing, the inner race being in snug association with the spindle, the bearings serving to support said spindle in the housing for rotation about a fixed axis in the housing and constraining the spindle against lateral shifting and tilting in the housing, said device including means to place the roller elements under axial load, said loading means comprising a first disc disposed about the spindle, the first disc having an annular first surface contacting one race of the one bearing, said first disc having an annular spherically curved second surface, a second disc of circular shape disposed about said spindle, said second disc having a substantially flat side surface directed toward said one bearing and said first disc, said second disc also having an arcuately curved relief providing a dished surface adjoining the flat surface, said dished and flat surfaces intersecting one another in the provision of a circular ridge concentric to the disc periphery, said ridge and said spherically curved second surface of said first disc abutting one another in a circular line contact, said first and second discs being movable relative to one another to assure uniform contact and distribution of axial forces over said circular line contact, said spherical curvature of said second surface of said first disc assuring said circular line contact in all normal relative positions of said first and second discs in use, one of said discs and said one race being constrained by the spindle to maintain coaxial relation, and the other of said discs being mounted for shifting movements incidental to said tilting relative to the constrained disc to the one race and to the spindle in a plane normal to the rotational axis of the spindle, means exerting axial force against the second disc, said axial force being transmitted to said first disc through said circular line contact, said force being further transmitted to said one race of said one bearing through said abutment between said first disc and said one race, means cooperating with the other race of said one bearing to prevent the axial shifting of the other race in the direction of said axial force, whereby to cause said axial force to axially move the one race relative to the other race and cause said bearing to be placed under load.

14. A high speed rotary tool holding device having a spindle, at least two bearings having rolling elements and inner and outer annular races, the bearings being disposed about the spindle and in snug association therewith, a housing disposed about the spindle and the bearings in snug association with the bearings, the inner races engaging the spindle, the outer races engaging the housing, said bearings supporting the spindle for rotation about a fixed axis in the housing and constraining the spindle against lateral shifting and tilting in the housing, said tool holding device including means to place at least one of the bearings under axial load, said means including first and second discs disposed about said spindle, said discs having complemental spherically curved surfaces in abutment with one another, such complemental surfaces comprising part of a sphere generated by a radius having a center on the axis of the spindle, said discs being relatively and laterally movable with respect to one another to provide appropriate alignment of each with other parts of the tool holding device with which the discs individually coact, one of said discs being in spindle surrounding contact with one race of one of the bearings, one of said discs and said one race being constrained by the spindle to maintain coaxial relation, and the other of said discs being mounted for shifting movements incidental to said tilting relative to the constrained disc to the one race and to the spindle in a plane normal to the rotational axis of the spindle, means to transmit an axial force to the other of said discs whereby to load the one bearing axially through transmission of such force from said other disc to said one disc through such complemental spherically curved surfaces and to the one race through such surrounding contact of the one race and the one disc, and means coacting with the other race of the one bearing to prevent axial movement of the other race in the direction of such axial force whereby to place the rolling elements of the bearing under axial load from such axial force being transmitted to the one race.

15. A high speed rotary tool holding device having a spindle, at least two bearings having rolling elements and inner and outer annular races, the bearings being disposed about the spindle and in snug association therewith, a housing disposed about the spindle and the bearings in snug association with the bearings, the inner races engaging the spindle, the outer races engaging the housing, said bearings supporting the spindle for rotation about a fixed axis in the housing and constraining the spindle against lateral shifting and tilting in the housing, said tool holding device including means to place at least one of the bearings under axial load, said means including first and second discs disposed about said spindle, said discs having complemental spherically curved surfaces in abutment with one another, such complemental surfaces comprising part of a sphere generated by a radius having a center on the axis of the spindle, said discs being relatively and laterally movable with respect to one another to provide appropriate alignment of each with other parts of the tool holding device with which the discs individually coact, said first disc being in spindle surrounding contact with one race of one of the bearings, the complemental contacting surface of said first disc being convex, the complemental contacting surface of said second disc being concave, one of said discs and said one race being constrained by the spindle to maintain coaxial relation, and the other of said discs being mounted for shifting movements incidental to said tilting relative to the constrained disc to the one race and to the spindle in a plane normal to the rotational axis of the spindle, means to transmit an axial force to the second disc, whereby to load the one bearing axially through transmission of such force from said second disc to said first disc through such complemental spherically curved surfaces and to the one race through such surrounding contact of the one race and the first disc, and means coacting with the other race of the one bearing to prevent axial movement of the other race in the direction of such axial force whereby to place the rolling elements of the bearing under axial load from such axial force being transmitted to the one race.

16. A high speed rotary tool holding device having a spindle, at least two bearings having rolling elements, the bearings being disposed about the spindle and in snug association therewith, a housing disposed about the spindle and the bearings in snug association with the bearings, said bearings supporting the spindle for rotation about a fixed axis in the housing and constraining the spindle against lateral shifting and tilting in the housing, said tool holding device including means to place at least one of the bearings under axial load, said means including first and second discs disposed about said spindle, said discs being in engagement over a spherically curved surface generated by a radius having a center on the axis of the spindle, said discs being relatively and laterally movable with respect to one another to provide appropriate alignment of each with other parts of the tool holding device with which the discs individually coact, said one bearing having inner and outer circular races, said first disc being in contact with said inner race, the outside diameter of said first disc being less than the inside diameter of said outer race, said housing having a circular inwardly directed surface in close association with the periphery of the second disc, whereby to provide a tool holding device in which lubricant supplied to said one bearing may shift axially past said first disc, one of said discs and said inner race being constrained by the spindle to maintain coaxial relation, and the other of said discs being mounted for shifting movements incidental to said tilting, relative to the constrained disc, to the inner race and to the spindle in a plane normal to the rotational axis of the spindle, means maintaining an axial thrust force on said second disc, whereby to load the one bearing axially through transmission of such force from said second disc to said first disc through the engaged spherically curved surface and from said first disc to said inner race, and means coacting with said outer race to prevent the axial shifting of said outer race in the direction of such axial force, whereby to permit the inner race to shift axially in response to said force and relative to said outer race to place said roller elements under load.

References Cited in the file of this patent

UNITED STATES PATENTS

| | | |
|---|---|---|
| 1,119,656 | Stafford | Dec. 1, 1914 |
| 1,352,918 | Rohbock | Sept. 14, 1920 |
| 1,736,972 | Hutchinson | Nov. 26, 1929 |
| 2,511,675 | Monpain | June 13, 1950 |
| 2,809,475 | Smith | Oct. 15, 1957 |

FOREIGN PATENTS

| | | |
|---|---|---|
| 167,624 | Great Britain | Aug. 18, 1921 |
| 972,394 | France | Jan. 29, 1951 |
| 695,275 | Great Britain | Aug. 5, 1953 |

UNITED STATES PATENT OFFICE
CERTIFICATE OF CORRECTION

Patent No. 2,935,364                         May 3, 1960

Horace P. Smith

It is hereby certified that error appears in the above numbered patent requiring correction and that the said Letters Patent should read as corrected below.

Column 5, line 8, for "peviously" read -- previously --; line 62, for "ing" read -- line --; column 7, line 47, for "base" read -- race --.

Signed and sealed this 24th day of April 1962.

(SEAL)

Attest:

ESTON G. JOHNSON
Attesting Officer

DAVID L. LADD
Commissioner of Patents